United States Patent
Yap et al.

(10) Patent No.: US 9,342,477 B2
(45) Date of Patent: May 17, 2016

(54) MULTI-CORE PROCESSOR, CONTROLLING METHOD THEREOF AND COMPUTER SYSTEM WITH SUCH PROCESSOR

(71) Applicant: RDC Semiconductor Co., Ltd., Hsinchu (TW)

(72) Inventors: Chang-Cheng Yap, Hsinchu (TW); Ming-Chi Shih, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 529 days.

(21) Appl. No.: 13/861,491

(22) Filed: Apr. 12, 2013

(65) Prior Publication Data

US 2014/0244975 A1  Aug. 28, 2014

(30) Foreign Application Priority Data

Feb. 27, 2013 (TW) .............. 102107032 A

(51) Int. Cl.
| | |
|---|---|
| G06F 13/12 | (2006.01) |
| G06F 15/00 | (2006.01) |
| G06F 15/76 | (2006.01) |
| G06F 15/177 | (2006.01) |
| G06F 9/50 | (2006.01) |

(52) U.S. Cl.
CPC ............ *G06F 15/177* (2013.01); *G06F 9/5061* (2013.01)

(58) Field of Classification Search
None
See application file for complete search history.

(56) References Cited

U.S. PATENT DOCUMENTS

| | | | | |
|---|---|---|---|---|
| 7,685,354 B1 * | 3/2010 | Hetherington | ........ | G06F 12/084 711/163 |
| 7,734,895 B1 * | 6/2010 | Agarwal | ................... | G06F 8/52 712/13 |
| 2005/0034002 A1 * | 2/2005 | Flautner | ................ | G06F 1/3203 713/322 |
| 2006/0004942 A1 * | 1/2006 | Hetherington | ........ | G06F 9/3802 711/3 |
| 2010/0088703 A1 * | 4/2010 | Whitfield | ............... | G06F 9/5027 718/101 |
| 2010/0180273 A1 * | 7/2010 | Harris | ................. | G06F 9/45533 718/1 |
| 2011/0167416 A1 | 7/2011 | Sager et al. | | |
| 2012/0166764 A1 * | 6/2012 | Henry | ................... | G06F 9/5094 712/43 |
| 2013/0306276 A1 * | 11/2013 | Duchesneau | ......... | G06F 9/5072 165/104.21 |
| 2014/0310468 A1 * | 10/2014 | Speier | ................. | G06F 12/0808 711/122 |

OTHER PUBLICATIONS

Taiwan Patent Office, "Office Action," May 28, 2015.

* cited by examiner

*Primary Examiner* — Michael Sun
(74) *Attorney, Agent, or Firm* — WPAT, P.C.; Justin King

(57) ABSTRACT

A multi-core processor includes M cores. If the multi-core processor is operated under a non-multiprocessing support operating system, only a single core is configured as a central processing unit and N cores are configured as co-processors, wherein M and N are positive integers, and N is smaller than M.

9 Claims, 3 Drawing Sheets

MULTI-CORE PROCESSOR, CONTROLLING METHOD THEREOF AND COMPUTER SYSTEM WITH SUCH PROCESSOR

This application claims the benefit of Taiwan Patent Application No. 102107032, filed Feb. 27, 2013, the subject matter of which is incorporated herein by reference.

FIELD OF THE INVENTION

The present invention relates to a processor, and more particularly to a multi-core processor. The present invention also relates to a controlling method of the multi-core processor and a computer system with the multi-core processor.

BACKGROUND OF THE INVENTION

With increasing development of computer technologies, the current operating system such as the Windows XP operating system, the Windows 7 operating system or the Windows 8 operating system can support multi-core processors. That is, a single central processing unit (CPU) of the computer system is replaced by a multi-core processor with multiple central processing units. The multi-core processor is designed to possess multiple central processing units in a single IC chip. Each central processing unit (CPU) may be considered as a core. The multi-core processor can process a large amount of computational data in a multi-tasking manner. For example, the multi-core processor can simultaneously process 2D image data and 3D image data, or simultaneously process image data and audio data while executing gaming software. When the multi-tasking software is executed, the performance of the computer system with the multi-core processor is largely enhanced.

FIG. 1 is a schematic functional block diagram illustrating the architecture of a conventional computer system. As shown in FIG. 1, the computer system comprises a multi-core processor 110, a memory controller 120, a memory 130, a graphics processing unit (GPU) 140, and a peripheral component 170. Moreover, the computer system may be optionally equipped with other co-processors such as digital signal processors (DSPs). The co-processors are controlled by the multi-core processor 110 to process specified data (e.g. audio data or image data). For example, as shown in FIG. 1, the computer system further comprises a first signal processor 150 and a second signal processor 160. Moreover, the peripheral component 170 (e.g. a south bridge chip) is connected with a low speed device (e.g. a mouse, a keyboard, or the like).

For example, the multi-core processor 110 is a four-core processor including four central processing units 112, 114, 116 and 118. All of the multi-core processor 110, the GPU 140, the first signal processor 150 and the second signal processor 160 and the peripheral component 170 can access the memory 130 through arbitration of the memory controller 120. As shown in FIG. 1, the memory controller 120 is not included in the multi-core processor 110. It is noted that the memory controller 120 may be installed in a north bridge chip (not shown) or integrated into the multi-core processor 110. Moreover, the memory 130 is partitioned into a main memory zone 132 and a frame buffer 134. The frame buffer 134 is used for temporarily storing the video image which is processed by the GPU 140. The data of other components are temporarily stored in the main memory zone 132.

When the computer system is booted, the number of cores of the multi-core processor 110 and associated information about the multi-core processor 110 are acquired according to the configuration settings of a basic input output system (BIOS) or other boot loader (e.g. redboot). After the computer system is booted and the operating system runs, the central processing units 112, 114, 116 and 118 of the multi-core processor 110 are all in the normal working state. Under this circumstance, these central processing units 112, 114, 116 and 118 can be independently operated to access the memory 130.

Moreover, for allowing the GPU 140, the first signal processor 150 and the second signal processor 160 to be normally operated under the operating system, the drivers for these components should be firstly installed on the operating system and thus these components can be normally operated. Of course, if the operating system of the computer system is updated, the drivers for these components should be re-installed in order to be normally operated under the new operating system.

Generally, the computer system with the multi-core processor should be operated under the early operating systems. The early operating systems include for example a DOS operating system or an old-kernel Linux operating system. However, the early operating systems usually fail to support the multi-core processor. If the computer system with the multi-core processor is operated under the early operating system, only one central processing unit (CPU) is enabled, but the other central processing units are disabled.

For example, in case that the computer system as shown in FIG. 1 is operated under the DOS operating system, during the process of booting the computer system, it is determined that the CPU 112 of the multi-core processor 110 is enabled but the other CPUs 114, 116 and 118 are disabled. Under this circumstance, the resources of the multi-core processor 110 are wasted.

As known, some early computer programs can be executed under the early operating systems, but cannot be executed under the new operating systems. For successfully executing the early computer programs, there is a need of providing a novel multi-core processor to be efficiently operated under the early operating systems.

SUMMARY OF THE INVENTION

An embodiment of the present invention provides a computer system. The computer system includes a multi-core processor with M cores, a peripheral component, a memory and a memory controller, wherein M is a positive integer. The memory controller is connected with the memory, the multi-core processor and the peripheral component, so that the memory is accessible to the multi-core processor and the peripheral component. If the computer system is operated under a non-multiprocessing support operating system, a single core is configured as a central processing unit and N cores are configured as co-processors, wherein N is a positive integer smaller than M.

Another embodiment of the present invention provides a multi-core processor with M cores. If the multi-core processor is operated under a non-multiprocessing support operating system, only a single core is configured as a central processing unit and N cores are configured as co-processors, wherein M and N are positive integers, and N is smaller than M.

A further embodiment of the present invention provides a controlling method of a multi-core processor. The multi-core processor includes M cores, wherein M is a positive integer. If the multi-core processor multi-core processor is operated under a non-multiprocessing support operating system, a single core is configured as a central processing unit and N cores are configured as co-processors, wherein N is a positive integer smaller than M. Then, the non-multiprocessing support operating system runs.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

As previously described, when the computer system with the current multi-core processor is operated under the early operating system, only one central processing unit (CPU) is enabled, but the other central processing units are disabled. In other words, the use of the current multi-core processor wastes resources. For overcoming the above drawbacks, the present invention provides the architecture of a multi-core processor, in which the operating modes of all cores of the multi-core processor can be determined according to practical requirements.

Figure 1:
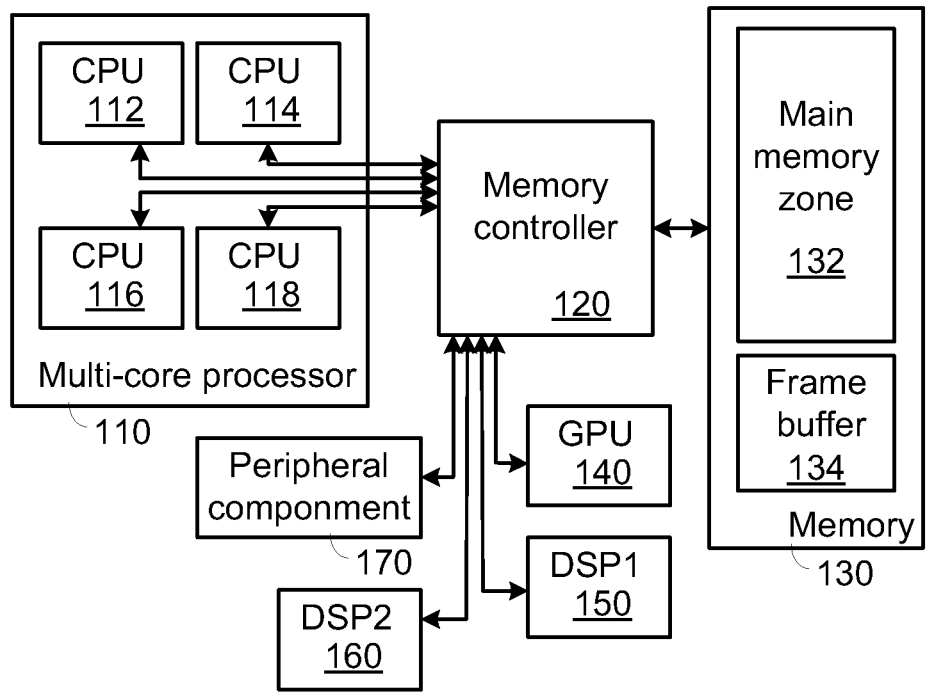
FIG. 1 (prior art) is a schematic functional block diagram illustrating the architecture of a conventional computer system.
Figure 2:
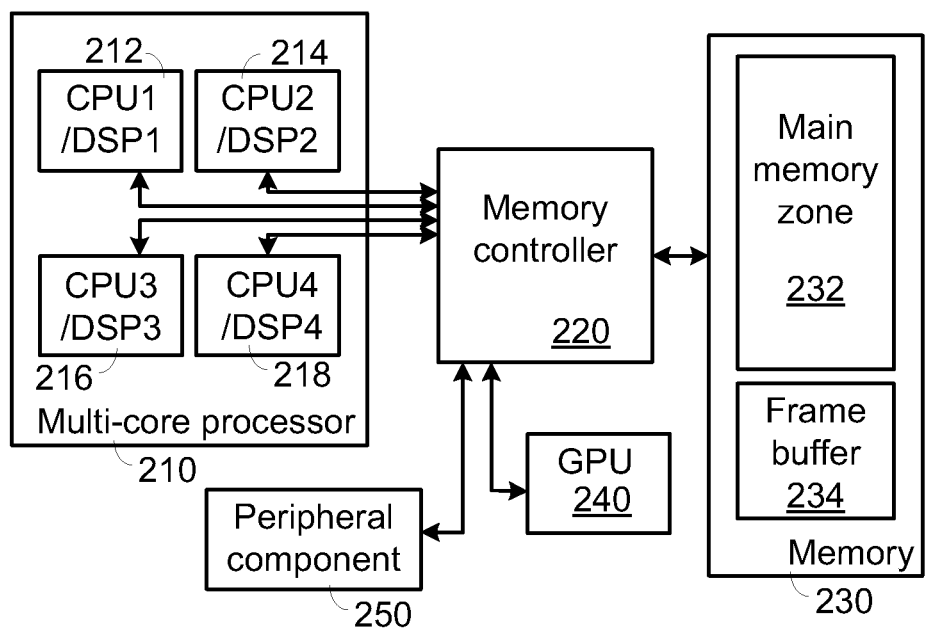
FIG. 2 is a schematic functional block diagram illustrating the architecture of a computer system with a multi-core processor according to an embodiment of the present invention.

FIG. 2 is a schematic functional block diagram illustrating the architecture of a computer system with a multi-core processor according to an embodiment of the present invention. In this embodiment, the computer system is an x86 computer system, and the multi-core processor is an x86 compatible processor. As shown in FIG. 2, the computer system comprises a multi-core processor 210, a memory controller 220, a memory 230, a graphics processing unit (GPU) 240, and a peripheral component 250. In this embodiment, the multi-core processor 210 is a four-core processor including four central processing units 212, 214, 216 and 218. It is noted that the number of cores of the multi-core processor 210 is not restricted. Moreover, the GPU 240 may be integrated into the multi-core processor 210.

Moreover, the multi-core processor 210, the GPU 240 and the peripheral component 250 can access the memory 230 through arbitration of the memory controller 220. Moreover, the memory 230 is partitioned into a main memory zone 232 and a frame buffer 234. The frame buffer 234 is used for temporarily storing the video image which is processed by the GPU 240. The data of other components are temporarily stored in the main memory zone 232.

In accordance with the present invention, the cores of the multi-core processor 210 may be configured as central processing units (CPUs) or co-processors. For example, the co-processors are digital signal processors (DSPs), but are not limited thereto.

In case that the computer system of the present invention is operated under an early operating system such as a DOS operating system or an old-kernel Linux operating system, the core 212 is configured as a central processing unit (CPU) and the cores 214, 216 and 218 are configured as co-processors according to the configuration settings. After the computer system is booted and the early operating system runs, the core 212 is used as the central processing unit CPU1. In addition, the cores 214, 216 and 218 are used as digital signal processors DSP2, DSP3 and DSP4, respectively, and controlled by the central processing unit CPU1. Consequently, all of the four cores 212, 214, 216 and 218 can be normally operated.

In case that the computer system of the present invention is operated under the operating system which supports the multi-core processor (e.g. the Windows XP operating system, the Windows 7 operating system or the Windows 8 operating system), all of the four cores 212, 214, 216 and 218 may be respectively configured as central processing units according to the configuration settings. After the computer system is booted and the operating system runs, all of the four cores 212, 214, 216 and 218 are used as the central processing units CPU1, CPU2, CPU3 and CPU4, respectively, and can be normally operated.

Alternatively, in case that the computer system of the present invention is operated under the operating system which supports the multi-core processor, some cores may be configured as central processing units and the other cores may be configured as co-processors according to dynamic configuration settings. For example, the two cores 212 and 214 may be configured as central processing units, and the other two cores 216 and 218 may be configured as digital signal processors. After the computer system is booted and the operating system runs, the two cores 212 and 214 are used as the central processing units CPU1 and CPU2, respectively. In addition, the two cores 216 and 218 are used as the digital signal processors DSP3 and DSP4, respectively, and controlled by the two cores 212 and 214. Consequently, all of the four cores 212, 214, 216 and 218 can be normally operated.

Generally, if the operating system for the computer system with the conventional multi-core processor is updated, the drivers for the co-processors should be re-installed according to the real situations. Since the multiple cores of the multi-core processor are all integrated into a single IC chip according to the present invention, if the operating system is updated, it is not necessary to re-install the drivers for the co-processors. Consequently, the installation of the operating system is more user-friendly.

Moreover, for clarification and brevity, only one memory 230, one memory controller 220 and one peripheral component 250 are shown in FIG. 2. It is noted that the numbers of the memory, the memory controller and the peripheral component are not restricted to the computer system of FIG. 2. In some other embodiments, the computer system of the present invention with the multi-core processor may comprise plural memories, plural memory controllers or plural peripheral components.

Figure 3:
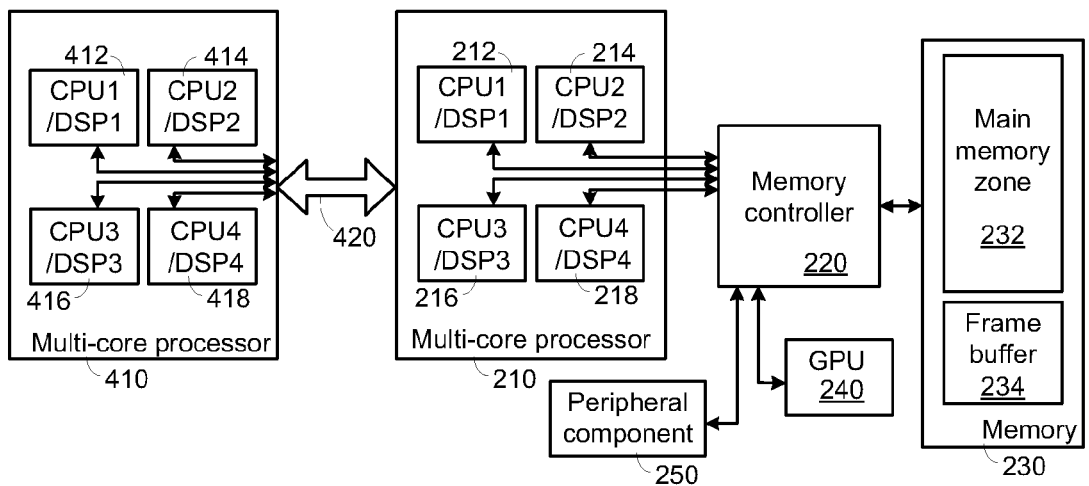
FIG. 3 is a schematic functional block diagram illustrating the architecture of a computer system with plural multi-core processors according to an embodiment of the present invention.

Moreover, for enhancing the computing performance, the computer system of the present invention may comprise plural multi-core processors. FIG. 3 is a schematic functional block diagram illustrating the architecture of a computer system with plural multi-core processors according to an embodiment of the present invention. In comparison with the computer system of FIG. 2, the computer system of this embodiment further comprises an additional multi-core processor 410. As shown in FIG. 3, the additional multi-core processor 410 is connected with the multi-core processor 210. In this embodiment, the additional multi-core processor 410 comprises four cores. It is noted that the number of the cores included in the additional multi-core processor 410 may be varied according to the practical requirements. Moreover, the concepts of the present invention may be expanded to the computer system with more than two multi-core processors.

Please refer to FIG. 3 again. Similarly, the cores 412, 414, 416 and 418 of the additional multi-core processor 410 may be configured as central processing units (CPUs) or co-processors.

In case that the computer system of the present invention is operated under the operating system which supports the multi-core processor (e.g. the Windows XP operating system, the Windows operating system 7 or the Windows 8 operating system), all of the four cores 212, 214, 216 and 218 of the original multi-core processor 210 are configured as central processing units and all of the four cores 412, 414, 416 and 418 of the additional multi-core processor 410 are configured as co-processors according to the configuration settings. After the computer system is booted and the operating system runs, the four cores 212, 214, 216 and 218 are used as the central processing units CPU1, CPU2, CPU3 and CPU4, respectively; and the four cores 412, 414, 416 and 418 are used as the co-processors DSP1, DSP2, DSP3 and DSP4, respectively. Consequently, the operating performance of the computer system is largely enhanced. Of course, each of the cores of the two multi-core processors 210 and 410 may be configured as a central processing unit or a co-processor.

Figure 4:
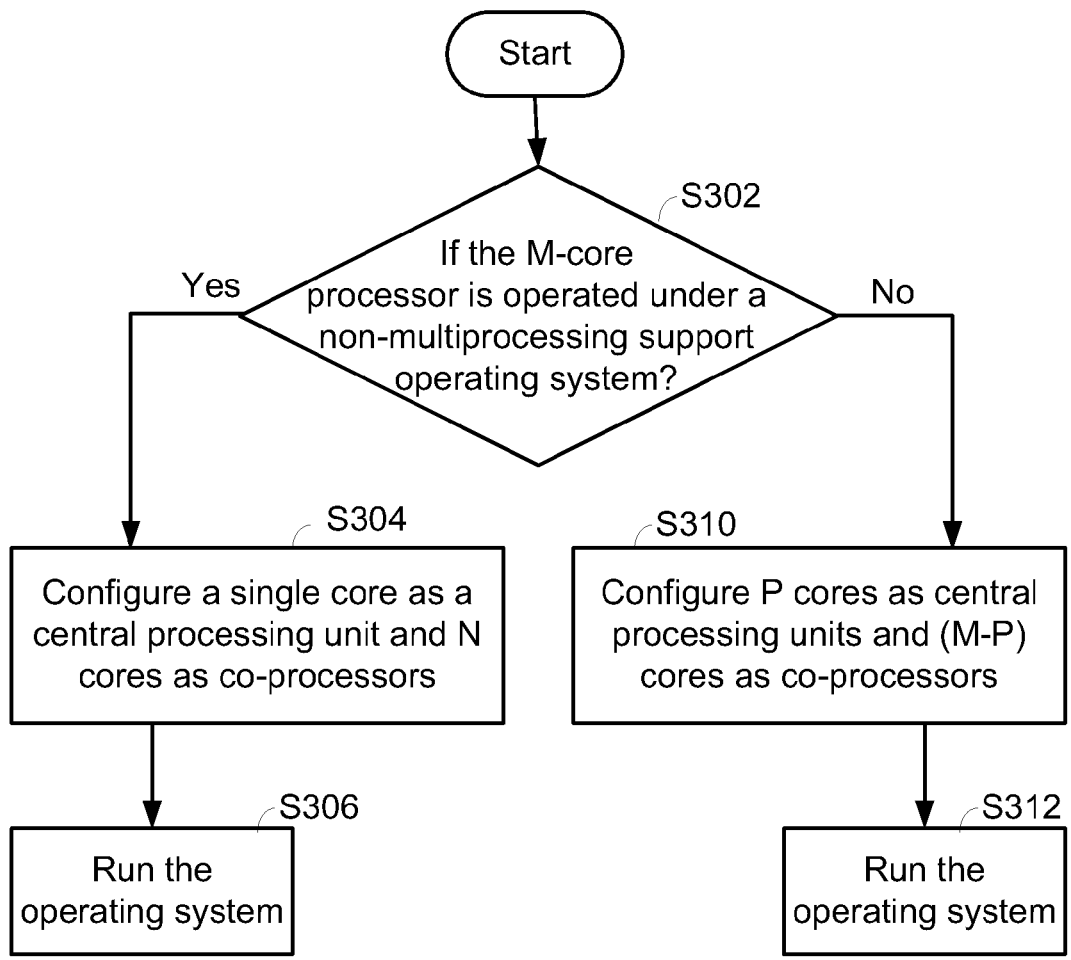
FIG. 4 is a flowchart illustrating a controlling method of the multi-core processor according to an embodiment of the present invention.

FIG. 4 is a flowchart illustrating a controlling method of the multi-core processor according to an embodiment of the present invention. For example, it is assumed that the multi-core processor is an M-core processor, wherein M is a positive integer. Firstly, the step S302 is performed to judge whether the M-core processor is operated under an operating system which does not support the M-core processor (also referred as a non-multiprocessing support operating system). If the M-core processor is operated under the non-multiprocessing support operating system (Step S302), a single core is configured as a central processing unit and N cores are configured as co-processors (Step S304), and then the operating system runs (Step S306). In this embodiment, if the M-core processor is operated under the non-multiprocessing support operating system, a single core is configured as the central processing unit, and N cores are configured as the co-processors according to the practical requirements, wherein N is a positive integer smaller than M. An example of the co-processor includes but is not limited to a digital signal processor (DSP).

If the multi-core processor is operated under an operating system which supports the M-core processor (also referred as a multiprocessing support operating system) in the step S302, P cores of the M-core processor are configured as central processing units and (M-P) cores of the M-core processor are configured as co-processors (Step S310), and then the operating system runs (Step S312). In this embodiment, if the M-core processor is operated under the multiprocessing support operating system, at least one core or plural cores (e.g. P cores) are configured as the central processing units and (M-P) cores are configured as the co-processors, wherein P is a positive integer smaller than or equal to M.

From the above descriptions, if the multi-core processor of the present invention is operated under an early operating system (i.e. the non-multiprocessing support operating system), a single core is configured as a central processing unit and the other cores are configured as co-processors. Consequently, the problem of wasting resources when the conventional multi-core processor is operated under the early operating system will be avoided. Moreover, if the multi-core processor of the present invention is operated under a new operating system (i.e. the multiprocessing support operating system), the function of each core of the multi-core processor can be dynamically set. Consequently, the performance of the multi-core processor is largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system, comprising:
    a first multi-core processor with a first core and a second core;
    a peripheral component;
    a memory; and
    a memory controller connected with the memory, the first multi-core processor, and the peripheral component, wherein the memory is accessible to the first multi-core processor and the peripheral component;
    wherein the computer system is configured to have said first core as a first central processing unit and configured to have said second core as a first digital signal processor when said first multi-core processor is operated under a non-multiprocessing support operation system, and running said non-multiprocessing support operating system; and
    wherein the computer system is configured to have said first core as said first central processing unit and configured to have said second core as a second central processing unit when said first multi-core processor is operated under a multiprocessing support operation system, and running said multiprocessing support operating system.

2. The computer system as claimed in claim 1, wherein the computer system is an x86 computer system, and the non-multiprocessing support operating system is a DOS operating system or an old-kernel Linux operating system.

3. The computer system as claimed in claim 1, wherein said first multi-core processor further comprises a third core, if the computer system is operated under said multiprocessing support operating system, the computer system is configured to have said third core as a co-processor.

4. The computer system as claimed in claim 1, further comprising a second multi-core processor, which is connected with said first multi-core processor, wherein said second multi-core processor comprises multiple cores, and each core of said second multi-core processor is selectively configured as the central processing unit or the co-processor when the computer system is running said multiprocessing support operating system.

5. A multi-core processor with a first core and a second core, wherein if the multi-core processor is operated under a non-multiprocessing support operating system, only said first core is configured as a central processing unit and said second core is configured as a first co-processor, and wherein said multi-core processor further comprises a third core, if the multi-core processor is operated under a multiprocessing support operating system, said third core of the multi-core processor is configured as a second co-processor.

6. The multi-core processor as claimed in claim 5, wherein the multi-core processor is an x86 compatible processor, and the non-multiprocessing support operating system is a DOS operating system or an old-kernel Linux operating system.

7. A controlling method of a multi-core processor, the multi-core processor comprising a first core and a second core, the controlling method comprising steps of:
 determining whether said multi-core processor is operated under a non-multiprocessing support operating system;
 configuring said first core as a first central processing unit and configuring said second core as a first digital signal processor when said multi-core processor is operated under said non-multiprocessing support operation system, and running said non-multiprocessing support operating system; and
 configuring said first core as said first central processing unit and configuring said second core as a second central processing unit when said multi-core processor is operated under a multiprocessing support operation system, and running said multiprocessing support operating system.

8. The controlling method as claimed in claim 7, wherein the multi-core processor is an x86 compatible processor, and the non-multiprocessing support operating system is a DOS operating system or an old-kernel Linux operating system.

9. The controlling method as claimed in claim 7, said multi-core processor further comprises a third core, further comprising steps of:
 if the multi-core processor is operated under said multiprocessing support operating system, configuring said third core as a co-processor; and
 running the multiprocessing support operating system.

* * * * *